US011258619B2

(12) United States Patent
Libin (10) Patent No.: US 11,258,619 B2
(45) Date of Patent: *Feb. 22, 2022

(54) INITIALIZING CHAT SESSIONS BY POINTING TO CONTENT (71) Applicant: EVERNOTE CORPORATION, Redwood City, CA (US)

(72) Inventor: Phil Libin, San Jose, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/723,292

(22) Filed: Dec. 20, 2019

(65) Prior Publication Data

US 2020/0145242 A1 May 7, 2020

Related U.S. Application Data (63) Continuation of application No. 14/261,618, filed on Apr. 25, 2014, now Pat. No. 10,523,454.

(60) Provisional application No. 61/834,568, filed on Jun. 13, 2013.

(51) Int. Cl.
*H04L 12/18* (2006.01)

(52) U.S. Cl.
CPC .............................. *H04L 12/1822* (2013.01)

(58) Field of Classification Search
CPC .................................................. H04L 12/1822
USPC ......................................................... 709/206
See application file for complete search history.

(56) References Cited

U.S. PATENT DOCUMENTS

| 9,641,471 | B2 * | 5/2017 | Lee ......................... H04L 51/10 |
| 10,120,541 | B2 * | 11/2018 | Shaw ..................... G06F 3/0484 |
| 10,134,194 | B2 * | 11/2018 | Kepner ................... G06T 11/60 |
| 2006/0123347 | A1 * | 6/2006 | Hewitt ..................... G06F 17/24 |
| | | | 715/748 |
| 2010/0070899 | A1 * | 3/2010 | Hunt ..................... G06F 3/0486 |
| | | | 715/769 |
| 2010/0205544 | A1 * | 8/2010 | Brzeski .................. H04L 12/66 |
| | | | 715/758 |
| 2013/0159849 | A1 * | 6/2013 | Lee ...................... G06F 17/2288 |
| | | | 715/272 |
| 2013/0260350 | A1 * | 10/2013 | Kutty ..................... G09B 19/00 |
| | | | 434/308 |
| 2015/0006648 | A1 * | 1/2015 | Cao ........................ H04L 51/20 |
| | | | 709/206 |

(Continued)

Primary Examiner — Kevin T Bates
Assistant Examiner — Ronak Patel
(74) Attorney, Agent, or Firm — Morgan, Lewis & Bockius LLP (57) ABSTRACT Integrating an application and a chat session includes a first user identifying content from the application, wherein the application is independent of any chat session, the first user initiating the chat session with at least a second user that is remote from the first user by transmitting the content from the first user to the second user, where the first and second user establish the chat session in response to the content being transmitted, and the first user and the second user sharing the content in connection with the chat session. The content may be a portion of a photograph, a portion of an image, a portion of text from a document, and/or a portion of a screen. The portion may be automatically identified following the user pointing and marking up the content. The first user may mark up the content before transmitting it to the second user.

20 Claims, 4 Drawing Sheets

(56) References Cited

U.S. PATENT DOCUMENTS

2015/0193492 A1* 7/2015 Gunaratne ........ G06F 17/30345
707/609
2017/0300588 A1* 10/2017 Johnson ............ G06F 17/30873

* cited by examiner

INITIALIZING CHAT SESSIONS BY POINTING TO CONTENT

RELATED APPLICATIONS

This application is a continuation of and claims priority to U.S. patent application Ser. No. 14/261,618, filed Apr. 25, 2014, entitled "Initializing Chat Sessions by Pointing to Content," which claims priority to U.S. Provisional Application No. 61/834,568, filed Jun. 13, 2013, and entitled "Initializing Chat Sessions by Pointing to Content." Each of these applications is incorporated herein by reference.

TECHNICAL FIELD

This application is directed to the field of transmission of information, and more particularly to the field of preparing digital data for mobile communications.

BACKGROUND

Mobile chat has become a mainstream worldwide communication medium. According to market data, message volume for mobile chat has long exceeded a volume of mobile operator supported SMS (Short Messaging Service) communications: for example, about 19 billion mobile chat messages have been sent daily over mobile chat applications in 2012, compared with 17.5 billion SMS messages. A disparity between mobile chat applications and traditional operator-supported messaging is expected to quickly grow; thus, volume forecasts for 2014 by market research companies are in the range of 50 billion mobile chat messages vs. 21 billion SMS messages per day. Some experts point out that the growth numbers for mobile chat may be much higher if an acceptance of an industry wide Joyn platform for unified messaging and file sharing across mobile platforms and operators quickly progresses.

A cumulative number of users for the top eight mobile chat applications has exceeded 1.5 billion people in 2013. These applications are: WhatsApp (recently acquired by Facebook, Inc.), BlackBerry Messenger, Viber, Nimbuzz, Apple's iMessage, KakaoTalk, Facebook Messenger for Android, and TenCent QQ and WeChat. Mobile operators and smartphone manufacturers are starting to add dedicated buttons to launch popular mobile chat applications with certain models of their phones, such as a WhatsApp button on a Nokia Asha 210 phone.

Wearable devices of different types, including Head-Mounted Displays (HMDs) and cameras, such as Google Glass, are expected to increasingly interoperate with mobile phones and applications, which may add new dimensions to mobile chat applications and pair them with augmented reality and sensor data.

One key advantage of mobile chat applications that makes them a desirable communications medium for a mass user is associated with their multimedia sharing and platform integration capabilities. For example, each of the three leading mobile chat applications in Asia: WeChat in China, KakaoTalk in Korea, and LINE in Japan are currently offering emoji, stickers and mobile games directly integrated into chat platforms; LINE has launched a line of cartoon characters with their own show and toys; KakaoTalk and Evernote Corporation of Redwood City, Calif. have announced integration of Evernote service features into the KakaoTalk chat platform. File and screen sharing and other enhanced communications features are already present in popular chat applications like Skype and have been included into short-term product roadmaps for other mobile chat applications.

Notwithstanding significant progress in the proliferation of mobile chat applications and in the development of features of mobile chat applications, mobile messaging still suffers from significant shortcomings with respect to capabilities of individual applications and the role of the applications within an overall mobile software ecosystem. One of the most noticeable flaws of mobile chat applications is an absence of meaningful integration of such applications into mainstream mobile software. Thus, in a widespread usage scenario, a person needs to communicate with other chat participants in conjunction with current on-screen and application content: images, maps, documents, web pages, charts, video, etc. However, the use of mobile chat applications is predominantly disconnected from such mainstream content consumption; it takes a significant effort and many steps to explain to other chat participants the nature of a user inquiry or a statement related to the present content on that user's screen. Additionally, existing methods for sharing such content are generally available only at the file exchange level and are time consuming and awkward.

Similarly, in an augmented reality context, a user may function within real life scenes where a communication need may be invited by a current environment with its changing features and situations. The existing mobile chat applications are poorly suited to meet such real-time requirements.

Accordingly, it is desirable to develop a cohesive interoperation between mainstream mobile applications and content management systems, on the one hand, and mobile chat applications, on the other hand.

SUMMARY

According to the system described herein, integrating an application and a chat session includes a first user identifying content from the application, wherein the application is independent of any chat session, the first user initiating the chat session with at least a second user that is remote from the first user by transmitting the content from the first user to the second user, where the first and second user establish the chat session in response to the content being transmitted, and the first user and the second user sharing the content in connection with the chat session. The content may be a portion of a photograph, a portion of an image, a portion of text from a document, and/or a portion of a screen. The portion may be automatically identified following the user pointing and marking up the content. The first user may mark up the content before transmitting it to the second user. The first user may initiate the chat with the content by a multi-touch gesture, a keyboard shortcut, and/or pointing an arrow drawn by software on a screen of a device containing the content. One of the users may facilitate the chat session using an augmented reality system and the content may be part of a real scene viewed by the one of the users with the augmented reality system. The second user may be part of a list of participants defined by the first user and/or part of a list of participants engaging in recent chat sessions with the first user. The second user may modify and mark up the content. The second user may be prohibited from marking up the content and/or modifying the content. Prior to transmission of the content, the first user may select from a set of standard comments/questions that are transmitted to the second user with the content. The first user may confirm the content prior to transmission. The chat session may run simultaneously on multiple devices of each of the users. The application may run on a non-mobile device of one of the users and the chat session may run simultaneously on a mobile device of the one of the users. Content may be selected on the non-mobile device. The chat session may be provided on a device using WhatsApp, BlackBerry Messenger, Viber, Nimbuzz, iMessage, KakaoTalk, Facebook Messenger, TenCent QQ, WeChat, or Skype. The chat session may be provided on a device using a browser. The chat session may be a mobile chat session. The content may be provided on at least one mobile device.

According further to the system described herein, computer software, provided in a non-transitory computer-readable medium, integrates an application and a chat session. The software includes executable code that identifies, for a first user, content from the application, where the application is independent of any chat session, executable code that initiates, for the first user, the chat session with at least a second user that is remote from the first user by transmitting the content from the first user to the second user, where the first and second user establish the chat session in response to the content being transmitted, and executable code that shares the content between the first user and the second user in connection with the chat session. The content may be a portion of a photograph, a portion of an image, a portion of text from a document, and/or a portion of a screen. The portion may be automatically identified following the user pointing and marking up the content. The content may be marked up before being transmitted it to the second user. The chat may be initiated using the content by a multi-touch gesture, a keyboard shortcut, and/or pointing an arrow drawn by software on a screen of a device containing the content. An augmented reality system may be used and the content may be part of a real scene viewed by one of the users with the augmented reality system. The second user may be part of a list of participants defined by the first user and/or part of a list of participants engaging in recent chat sessions with the first user. The second user may modify and mark up the content. The second user may be prohibited from marking up the content and/or modifying the content. Prior to transmission of the content, the first user may select from a set of standard comments/questions that are transmitted to the second user with the content. The first user may confirm the content prior to transmission. The chat session may run simultaneously on multiple devices of each of the users. The application may run on a non-mobile device of one of the users and the chat session may run simultaneously on a mobile device of the one of the users. Content may be selected on the non-mobile device. The chat session may be provided on a device using one of: WhatsApp, BlackBerry Messenger, Viber, Nimbuzz, iMessage, KakaoTalk, Facebook Messenger, TenCent QQ, WeChat, or Skype. The chat session may be provided on a device using a browser. The chat session may be a mobile chat session. The content may be provided on at least one mobile device.

The proposed system integrates chat applications into mobile and desktop software workflow, including methods for selecting portions of content for transmission to chat participants, methods for identifying user instructions to initiate chat session and transmit the selected content, including pointing to the content, and sharing of on-screen content with chat participants with a possible addition of user authored or standard comments.

Integration of chat systems into software may include an ability to extract (clip) portions of on-screen content displayed to a user in desktop and mobile applications such as web browsers, document viewing and authoring applications (for example, office applications, image and video viewers and editors, photo capturing and editing software, games, etc.), and instantly initiate a mobile chat session where the extracted content is transmitted and shared between chat participants. This approach cardinally differs from a non-transparent content transmission method in the existing mobile chat applications, as explained elsewhere herein.

Depending on a platform, device, software title and interoperability features, such content extraction may represent clipped content in different formats: it may be a snapshot of a selected portion of a user screen or a whole screen in a common image format, with or without added user markup and/or caption; a portion of plain or formatted text of a document; a photo taken in an original photo capturing or image editing application, with or without subsequent user markup; etc. Content may also be captured and transmitted in several alternative formats and then displayed to chat participants in one of the available formats, depending on participants' chat settings and capabilities of their client (browser based chat software).

Content selection may be done via native software selection means, such as contiguous selection of textual fragments or a range of table cells in office software; visual selection using graphical capabilities utilized in image editors or in markup software, such as Evernote Skitch; etc. Additionally, selection software within an integrated chat system may be able to automatically choose a portion of content to which a user has pointed as a natural selection candidate.

A chat session with a selected content may be initiated via a dedicated gesture or a shortcut, such as pointing an arrow to a selected fragment, making a multi-touch gesture, entering a keyboard shortcut, etc. Such user instruction may result in an immediate opening of native mobile chat software or a browser based version of mobile chat software, starting a new chat session if the user is not in a session, and transmitting the selected content to chat participants. The list of participants may be defined on the fly via explicit user choice from the list of contacts or may use various other options, such as indicating participants of a most recent chat session as a default option or suggesting most frequent participants of chat sessions with the user as a priority list. Specific display formats for the transmitted content may be different for different participants of the chat session, as explained elsewhere herein. For some of the participants, the transmitted content may be represented in an editable format, allowing the participants to modify the original content and share the modified fragment. For other participants, markup on top of the received content without modifying the transmitted fragment may be available in chat client software used by the other participants. Yet another group of participants may only be able to add comments to the received fragment without any editing or markup features.

Prior to transmitting a selected fragment of content, the system may display to sender a standard set of comments or questions to be transmitted with the content, such as "what is this?", "how do I get there?", "which one?", "look how great it is!", etc. A chosen comment or question may be added to the transmitted content, possibly with additional textual comments explicitly added by the sender. Users may be able to customize and augment lists of standard comments and questions.

When a user points to an object to initiate a chat session without an explicit content selection, the system may determine a selected candidate and either highlight the selected candidate for approval by the user prior to transmission or immediately transmit the selected candidate to chat participants. For example, a user may point a session initialization arrow to a textual content and the system may offer in response a paragraph of text to which the user is pointing as a natural selection candidate. In some embodiments, there may be additional conventions regarding disposition of a pointing arrow with respect to text causing selection of different portions of text (in the absence of an explicit content selection by the user). For example, pointing an arrow nearly vertically to a line of text may be interpreted as a line selection, while pointing the same arrow nearly horizontally to a middle of a paragraph of text without touching the text may cause a selection of the whole paragraph. Other examples may include images, drawings, charts or other objects within a document, pointing to which may cause suggesting of a target object as a selection candidate.

The system may run on multiple devices of a single user. For example, the user may be viewing or editing content on a tablet, a notebook or a desktop computer and may initiate a chat session from a smartphone by pointing to a portion of content on the tablet, notebook or desktop. In this case, the content may be first transmitted to the smartphone of the user using any available network connection, such as Bluetooth, Wi-Fi, WAN (possibly using a cloud service to temporarily store and transmit content) or any combination of transmission mechanisms.

For augmented reality systems, such as Google Glass, the system presents an opportunity to instantly point out an object or area of interest on a photograph of a real scene the user is looking at, and transmit the object or area of interest to other chat participants for answers, comments and markup by the other participants, which may direct further actions of the user.

BRIEF DESCRIPTION OF THE DRAWINGS

Embodiments of the system described herein will now be explained in more detail in accordance with the figures of the drawings, which are briefly described as follows.

DETAILED DESCRIPTION

The system described herein provides a mechanism for initializing mobile chat sessions between participants instantly using and sharing content present on a mobile device or a desktop computer of a session organizer, the system incorporates session initializing software into a common application environment and a mobile chat application and implements selection and pointing features to identify and transmit portions of content.

Figure 1:
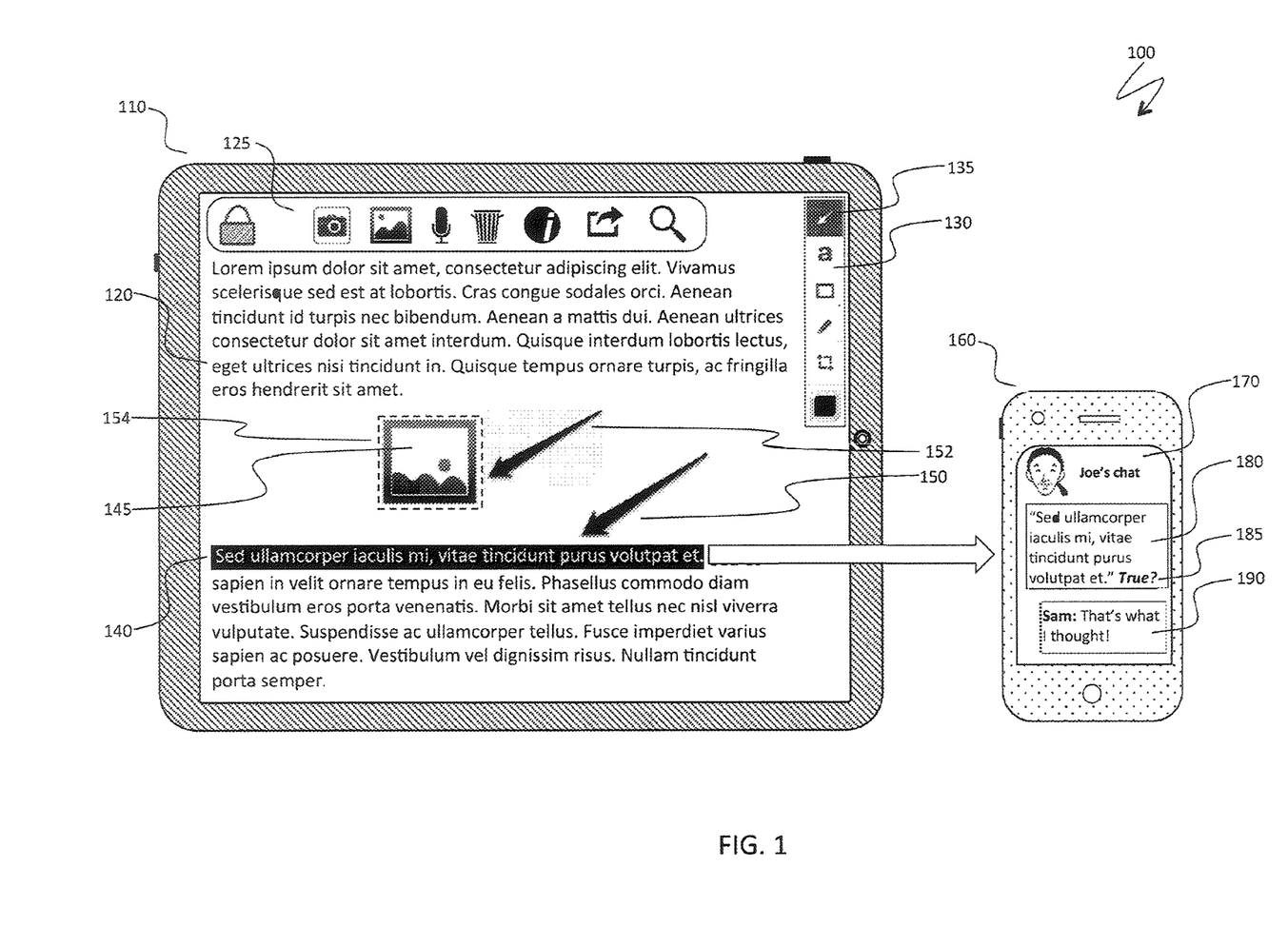
FIG. 1 is a schematic illustration of initialization of a chat session by pointing to a selected or non-selected on-screen content, according to embodiments of the system described herein.

FIG. 1 is a schematic illustration 100 of initialization of a chat session by pointing to selected or non-selected on-screen content. The chat session may use a browser on a mobile device and/or may be specialized software such as WhatsApp, BlackBerry Messenger, Viber, Nimbuzz, Apple's iMessage, KakaoTalk, Facebook Messenger, TenCent QQ and WeChat. In other instances, an application such as Skype may be used. A tablet 110 is running a software application 120 with an application toolbar 125. The system described herein is incorporated into the application environment and the system toolbar 130 with a pointing arrow tool 135 is displayed on the tablet screen.

FIG. 1 illustrates two scenarios of initialization of a mobile chat session. Under the first scenario, a user selects a portion of text 140 and draws a pointing arrow 150 to the selection. The pointing arrow 150 causes instant interoperation of the tablet 110 with a smartphone 160 of a user, so that a mobile chat application 170 on the smartphone 160 is instantly launched if the user has not already been in a chat session. The selected content 140 is instantly transferred to the smartphone 160 and placed it into a chat application window 180. The user may add comments 185 to the original content and send a message with selected content and comments to other chat participant(s). FIG. 1 schematically illustrates further communications where another participant of the mobile chat session has received a message and sent back a reply message 190.

Under the second scenario, the user is pointing with an arrow 152 (drawing a pointing arrow) that points to an image 145 embedded in a currently displayed document. This causes a selection marker 154 to appear around the image 145 indicating to the user which part of the document content is about to be transmitted to participants of a mobile chat session (a mobile chat portion on the smartphone 160 is not shown in FIG. 1).

Figure 2:
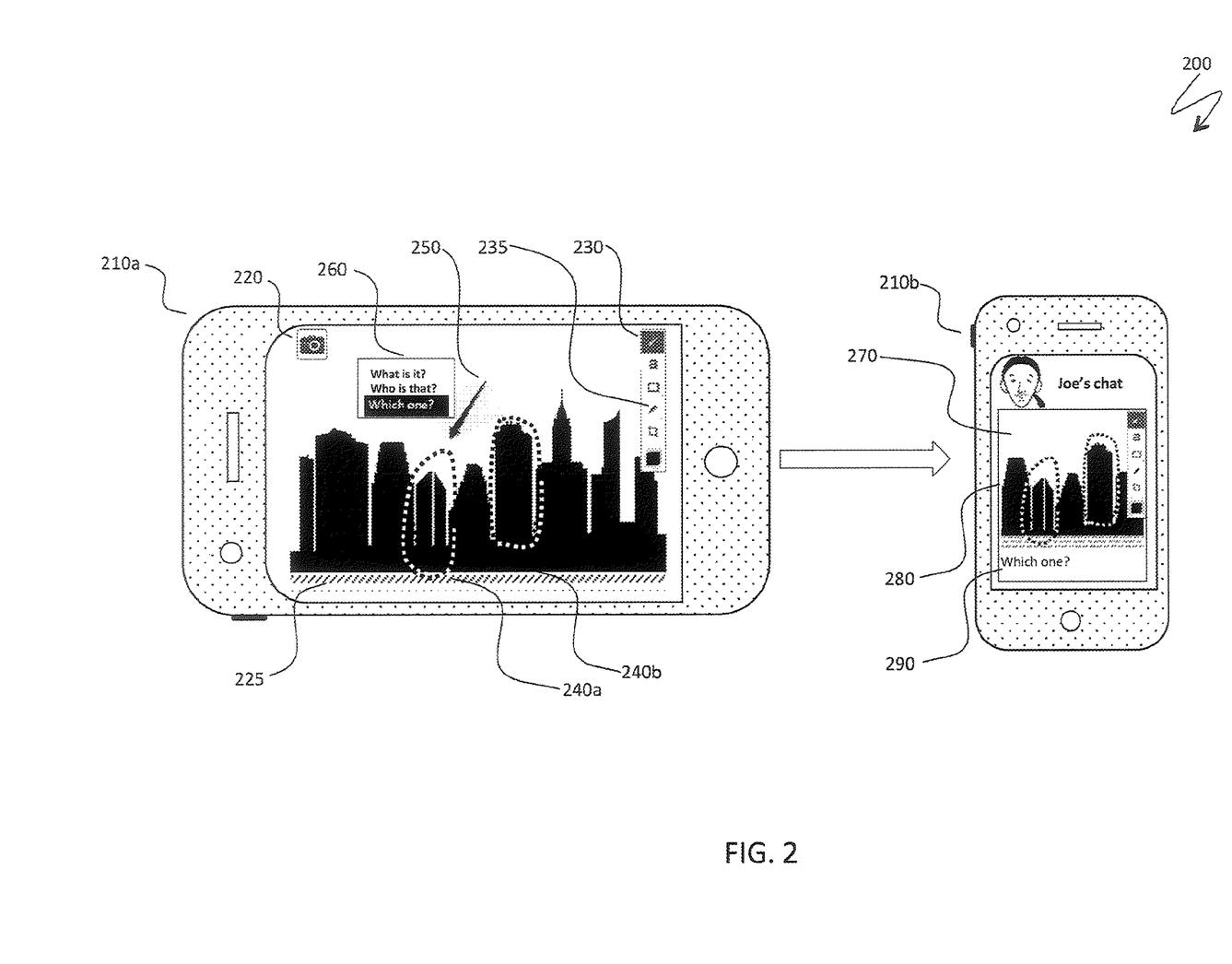
FIG. 2 schematically illustrates selection of a graphical content and standard comments presented to a user prior to content transmission, according to embodiments of the system described herein.

FIG. 2 is a schematic illustration 200 of selection of graphical content and of standard comments presented to a user prior to content transmission. A smartphone, shown on the left in a landscape mode 210 a, runs a photo capturing application 220; a photograph 225 of a city skyline is displayed on a screen of the smartphone. The system described herein is incorporated into an application environment and a toolbar of the smartphone with a pointing arrow 230 and a drawing tool 235 for object selection is shown on the screen. The tool 235 allows selecting multiple fragments of an on-screen content by freehand encircling the fragments. In FIG. 2, the user encircles two fragments 240 a, 240 b using the tool 235 (possibly looking to clarify an address approaching a friend's location). After the user has drawn an arrow 250 pointing at one of the selected content fragments using a tool 230, the system may present the user with a list 260 of standard comments and/or questions. In FIG. 2, the list 260 is arranged as a selectable menu and an item chosen by the user, displayed over a black selection background, reflects a choice made by the user.

After initialization data is collected, the smartphone switches to a mobile chat application shown in a smaller size and a portrait mode 210 b. Then, the system captures a portion of the photograph 225 around selected fragments 240 a, 240 b and compiles a mobile chat message 270 by combining a portion 280 of the photo 225 with a standard comment 290 chosen by the user from the list 260. The message is ready for sharing with other mobile chat participants, although the user may choose to add custom textual comments.

Figure 3:
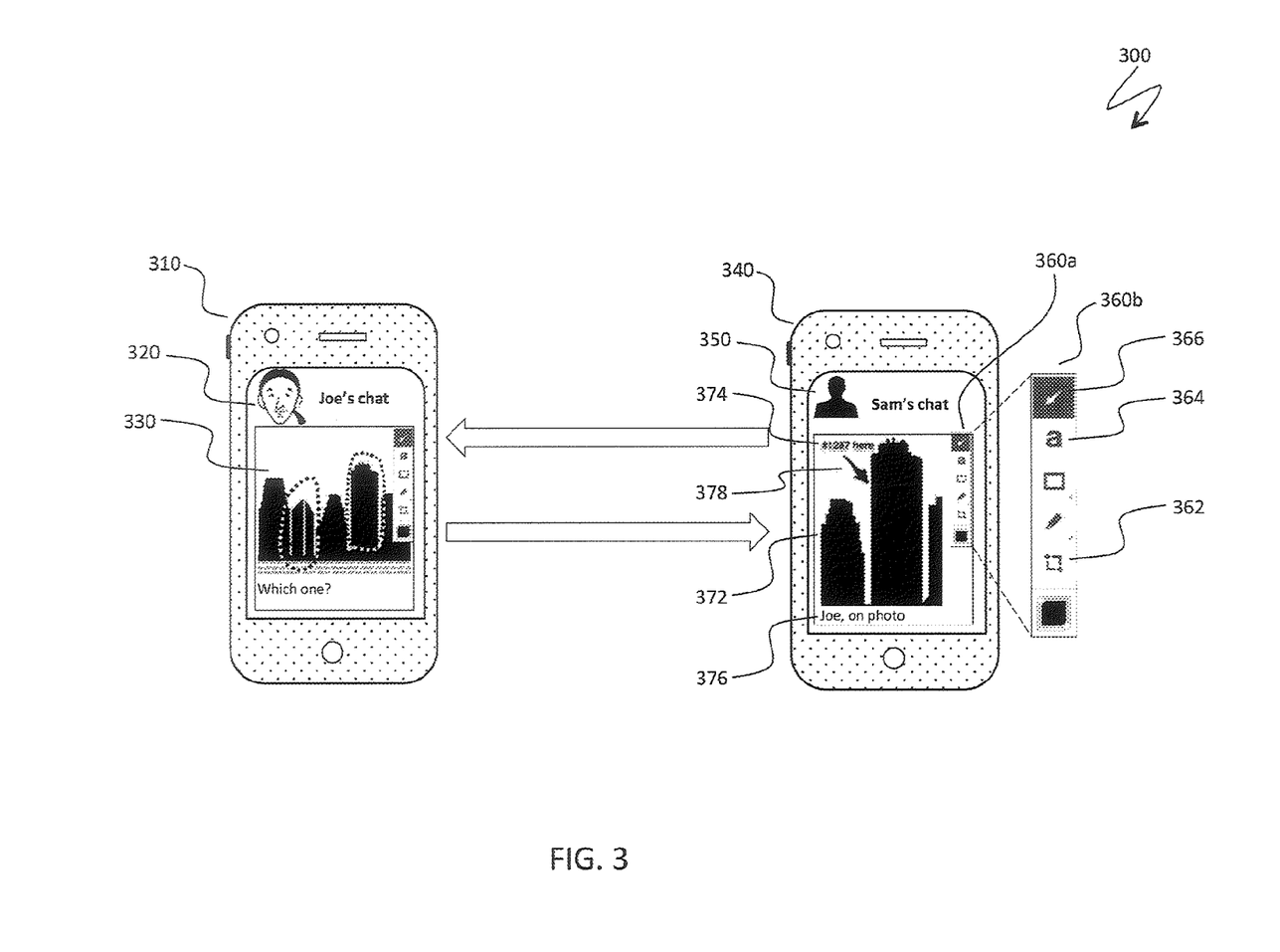
FIG. 3 is a schematic illustration of two-way content transmission during a mobile chat session based on selection and pointing, according to embodiments of the system described herein.

FIG. 3 is a schematic illustration 300 of two-way content transmission during a mobile chat session based on selection and pointing. A smartphone 310 runs a mobile chat application of a first participant 320, which may send a mobile message 330, generated from user content on the smartphone 310 using selection and pointing, as explained in more detail in conjunction with FIG. 2. The message 330 is received on a different smartphone 340 running a mobile chat application for a second participant 350; note that there may be more participants of the mobile chat session. The second participant 350 also runs the system and a toolbar 360a is displayed on a screen of the smartphone 340. A magnified copy 360b of the toolbar 360a is shown in FIG. 3 for convenience. The toolbar 360a, 360b may include, among other tools, a cropping tool 362 to clip portions of received images; a text tool 364 to add comments directly on images; and a pointing arrow tool 366. In FIG. 3, the second participant 350 crops a received image to retain a relevant portion 372; adds a text comment 374 directly on the image, types in an additional text comment 376 in the chat window and uses a pointing arrow tool 366 both to markup an image by adding an arrow 378 and to send back a response.

Note that the behavior of the pointing arrow tool 366 may be pre-programmed or customized by the second participant 350 in a way that is different from the embodiment of the system described in connection with FIG. 2. In particular, the arrow 378 in FIG. 3 is used to send a mobile message rather than to initiate object selection, as explained elsewhere herein. Additionally, the pointing arrow tool 366 may be pre-programmed to stay as part of the image (the arrow 378) rather than disappear; alternatively, the pointing arrow tool 366 may exhibit behavior caused by additional user interface action, such as, for example, pressing and holding the arrow 378 for a short time after the arrow 378 that has been drawn on the screen may cause its appearance on the image as a permanent markup element.

Figure 4:
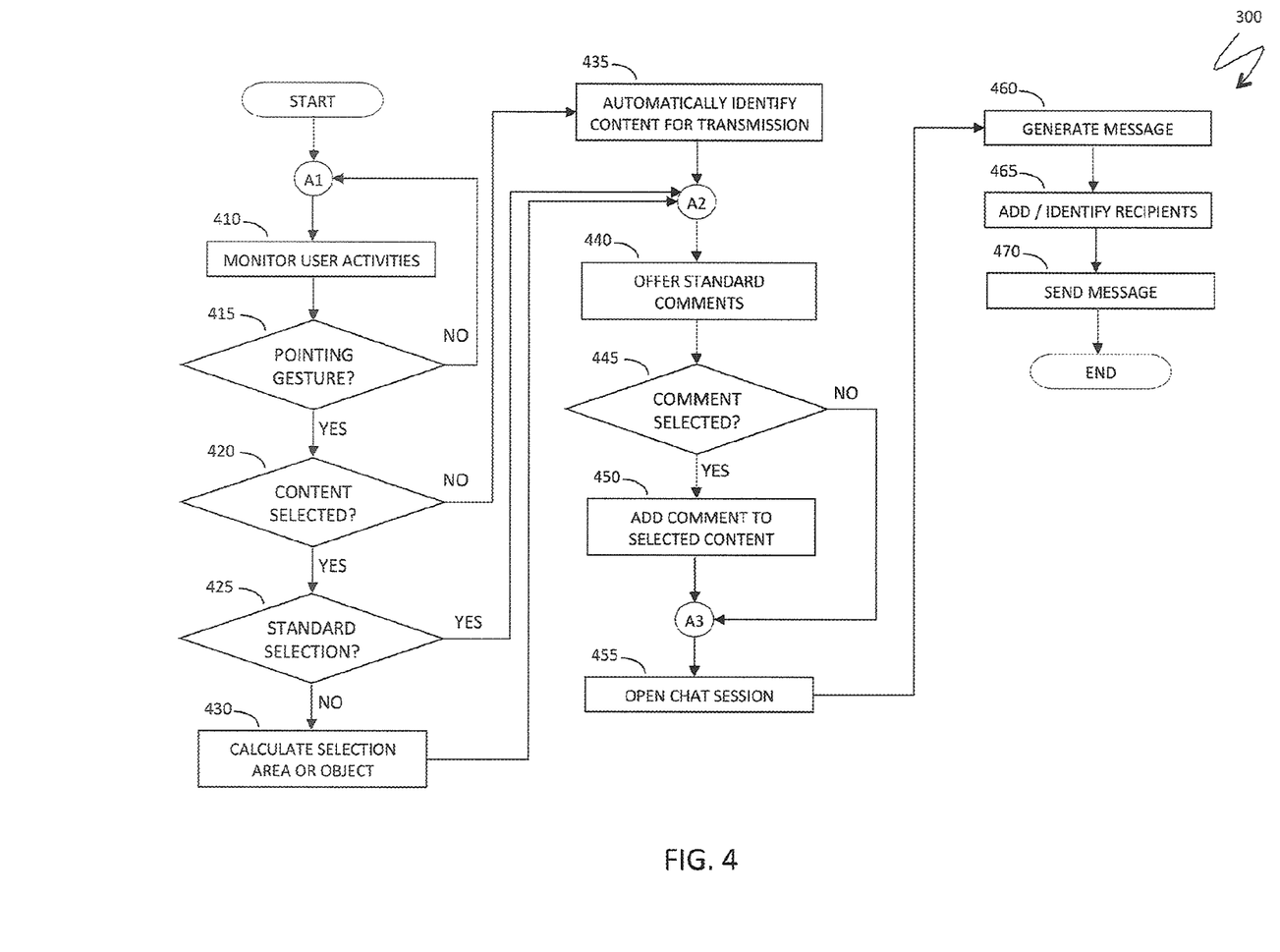
FIG. 4 is a system flow diagram illustrating operation of the system, according to embodiments of the system described herein.

Referring to FIG. 4, a flow diagram 400 illustrates functioning of the system described herein. Processing starts at a step 410 where the system monitors user activities in an application environment on a mobile device or on a desktop computer. After the step 410, processing proceeds to a test step 415, where it is determined whether the user performs a pointing gesture. If not, then processing proceeds back to the step 410. Otherwise, processing proceeds to a test step 420, where it is determined whether the pointing gesture has been performed when there is already a content selected by the user utilizing system tools. If so, then processing proceeds to a test step 425, where it is determined whether the selection is a standard selection used in text editing and other applications that unambiguously identifies the selected object. If not, then processing proceeds to a step 430 where the system calculates selection area or objects, such as, for example, a portion 280 of an image containing multiple selections 240 a, 240 b in FIG. 2.

If it is determined at the test step 420 that there is no content already selected, then processing proceeds to a step 435 where the system automatically identifies content for transmission using different clues, which may be based on pointing arrow's direction and position, as explained elsewhere herein. After the step 435, processing proceeds to a step 440, which may also be independently reached from the step 435 or from the step 425 if the user does not make a standard selection. At the step 440, the system offers to the user a list of standard comments or questions to choose from, as explained elsewhere herein, in particular, in the accompanying text to FIG. 2. After the step 440, processing proceeds to a test step 445, where it is determined whether the user has selected a standard comment from the list. If so, processing proceeds to a step 450, where the selected comment is added to the selected content, as explained in conjunction with FIG. 2. After the step 450, processing proceeds to the step 455, which may be independently reached from the step 445 if the user does not select a standard comment.

At the step 455, the system opens a mobile chat session. After the step 455, processing proceeds to a step 460 where the system generates a message, combining one or more of a selected content, a selected standard comment and a custom comment added by the user. After the step 460, processing proceeds to the step 465 where the user adds or identifies desired recipients of the mobile message using different techniques, as explained elsewhere herein. Note that in a situation when the user participates in an ongoing mobile chat session, rather than opens a new session to present the selected content with comments, the step 465 may be omitted, unless the user wants to alter the already existing list of participants in the context of continued mobile chat session. After the step 465, processing proceeds to a step 470 where the mobile chat application sends the message. After the step 470, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a smartphone, although other devices, such as wearable computers, are also possible. The system described herein may be implemented with any type of electronic screen capable of being actuated by a touch screen, electromagnetic or other pen.

Note that the mobile device(s) may include software that is pre-loaded with the device, installed from an app store, installed from a desktop (after possibly being pre-loaded thereon), installed from media such as a CD, DVD, etc., and/or downloaded from a Web site. The mobile device may use an operating system such as iOS, Android OS, Windows Phone OS, Blackberry OS and mobile versions of Linux OS.

Software implementations of the system described herein may include executable code that is stored in a computer readable medium and executed by one or more processors, including one or more processors of a desktop computer. The desktop computer may receive input from a capturing device that may be connected to, part of, or otherwise in communication with the desktop computer. The desktop computer may include software that is pre-loaded with the device, installed from an app store, installed from media such as a CD, DVD, etc., and/or downloaded from a Web site. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A content sharing method, comprising:
executing a user application at a first electronic device, including displaying content in a first interface of the user application and receiving a user selection of a subset of the content displayed in the first interface of the user application; and
in response to the user selection of the subset of the content:
automatically initiating communication in a messaging application executed at a second electronic device that is distinct from and communicatively coupled to the first electronic device;
transferring the subset of the content from the first electronic device to the second electronic device;
displaying the subset of the content in a second interface of the messaging application;
generating, in the messaging application, a message including the subset of the content; and
transmitting, in the messaging application, the message including the subset of the content, thereby allowing the content displayed on the first electronic device to be shared via the messaging application executed by the second electronic device.

2. The method of claim 1, further comprising in response to the user selection of the subset of the content, automatically launching the messaging application at the second electronic device prior to initiating the communication in the messaging application.

3. The method of claim 1, further comprising:
identifying a second user in a session associated with the communication for receiving the message from a first user of the first electronic device, wherein the message is transmitted from the second electronic device to a third electronic device of the second user, thereby allowing the first user and the second users to share the content displayed on the first electronic device via the messaging application.

4. The method of claim 3, wherein the second user is at least one of: part of a list of participants defined by the first user and part of a list of participants engaging in recent chat sessions with the first user.

5. The method of claim 3, wherein the second user modifies and marks up the subset of the content via the messaging application.

6. The method of claim 1, wherein the messaging application is an instant messaging application, and the communication includes a real-time chat session implemented by the instant messaging application.

7. The method of claim 1, wherein the first electronic device includes one of a tablet computer, a notebook computer and a desktop computer, and the second electronic device includes one of a mobile phone.

8. The method of claim 1, wherein the content includes text, and the subset of the content is a portion of the text.

9. The method of claim 8, further comprising:
displaying in the second interface of the messaging application the subset of the content to allow a first user of the second electronic device to edit the subset of the content to be transmitted in the message.

10. The method of claim 8, wherein receiving the user selection of the subset of the content further comprises:
receiving a user input of highlighting the portion of the text;
detecting that a pointing affordance is associated with the user input; and
in accordance with detection that the pointing affordance is associated with the user input, identifying the user selection of the subset of the content.

11. The method of claim 1, further comprising:
receiving user comments in the second interface of the messaging application, wherein the message includes the user comments.

12. A content sharing system, comprising:
one or more processors; and
memory storing one or more programs to be executed by the one or more processors for:
executing a user application at a first electronic device, including displaying content in a first interface of the user application and receiving a user selection of a subset of the content displayed in the first interface of the user application; and
in response to the user selection of the subset of the content:
automatically initiating communication in a messaging application executed at a second electronic device that is distinct from and communicatively coupled to the first electronic device;
transferring the subset of the content from the first electronic device to the second electronic device;
displaying the subset of the content in a second interface of the messaging application;
generating, in the messaging application, a message including the subset of the content; and
transmitting, in the messaging application, the message including the subset of the content, thereby allowing the content displayed on the first electronic device to be shared via the messaging application executed by the second electronic device.

13. The content sharing system of claim 12, wherein the content includes an image embedded in a document associated with the content, and the subset of the content is an entirety or a fragment of the image.

14. The content sharing system of claim 13, wherein receiving the user selection of the subset of the content further comprises:
receiving a user input to associate a pointing affordance is associated with the image; and
in accordance with detection that the pointing affordance with associated with the user input, identifying the user selection of the subset of the content.

15. The content sharing system of claim 13, wherein receiving the user selection of the subset of the content further comprises:
receiving a user input to point and mark up the fragment of the image; and
in accordance with the user input, identifying the user selection of the fragment of the image as the subset of the content to be transmitted in the message.

16. The content sharing system of claim 12, the memory further storing programs for:
displaying a system toolbar concurrently with the content in the first interface of the user application, the system toolbar including at least a drawing tool for selecting a fragment of an image and a pointing tool for selecting an image or a portion of text.

17. A non-transitory computer readable storage medium storing one or more programs, which when executed by a computer system cause the computer system to implement operations comprising:

executing a user application at a first electronic device, including displaying content in a first interface of the user application and receiving a user selection of a subset of the content displayed in the first interface of the user application;

in response to the user selection of the subset of the content:
  automatically initiating communication in a messaging application executed at a second electronic device that is distinct from and communicatively coupled to the first electronic device;
  transferring the subset of the content from the first electronic device to the second electronic device;
  displaying the subset of the content in a second interface of the messaging application;
  generating, in the messaging application, a message including the subset of the content; and
  transmitting, in the messaging application, the message including the subset of the content, thereby allowing the content displayed on the first electronic device to be shared via the messaging application executed by the second electronic device.

18. The non-transitory computer readable storage medium of claim 17, wherein transmitting the message further comprises transmitting the subset of the content from the first electronic device to a server system and storing the subset of the content temporarily in the server system.

19. The non-transitory computer readable storage medium of claim 18, wherein the user comments are selected from a set of standard comments/questions for transmission with the subset of the content.

20. The non-transitory computer readable storage medium of claim 17, wherein the user application is associated with an augmented reality system, and the content is part of a real scene viewed by a user of the augmented reality system.

* * * * *

UNITED STATES PATENT AND TRADEMARK OFFICE
CERTIFICATE OF CORRECTION

PATENT NO. : 11,258,619 B2
APPLICATION NO. : 16/723292
DATED : February 22, 2022
INVENTOR(S) : Libin Page 1 of 1

It is certified that error appears in the above-identified patent and that said Letters Patent is hereby corrected as shown below:

In the Claims

Claim 14, Column 10, Line 47, please delete "with associated with" and insert --is associated with--.

Signed and Sealed this
Twenty-first Day of June, 2022

Katherine Kelly Vidal
*Director of the United States Patent and Trademark Office*